United States Patent
Rawson et al.

[11] Patent Number: 5,918,858
[45] Date of Patent: *Jul. 6, 1999

[54] UNDULATING TRANSVERSE INTERFACE FOR CURVED FLAPPER SEAL

[75] Inventors: Michael S. Rawson, Tulsa; Doug Trott, Coweta; Mark S. Megill, Tulsa; Clifford H. Beall, Broken Arrow, all of Okla.

[73] Assignee: Baker Hughes Incorporated, Houston, Tex.

[ * ] Notice: This patent is subject to a terminal disclaimer.

[21] Appl. No.: 08/900,369

[22] Filed: Jul. 23, 1997

Related U.S. Application Data

[63] Continuation of application No. 08/654,377, May 28, 1996, Pat. No. 5,682,921.

[51] Int. Cl.⁶ .................................................. F16K 1/18
[52] U.S. Cl. ..................... 251/359; 137/527.6; 166/332.8
[58] Field of Search .................................. 251/303, 359; 137/527, 527.6, 527.8; 166/332.8

[56] References Cited

U.S. PATENT DOCUMENTS

| | | | |
|---|---|---|---|
| 474,843 | 5/1892 | Mahan | 137/527.8 |
| 3,612,098 | 10/1971 | Bora et al. . | |
| 4,415,036 | 11/1983 | Carmody et al. . | |
| 4,427,071 | 1/1984 | Carmody . | |
| 4,433,702 | 2/1984 | Baker . | |
| 4,531,587 | 7/1985 | Fineberg . | |
| 4,674,575 | 6/1987 | Guess | 251/359 |
| 4,825,902 | 5/1989 | Helms . | |
| 4,907,650 | 3/1990 | Heinonen . | |
| 4,926,945 | 5/1990 | Pringle et al. . | |
| 4,945,993 | 8/1990 | Dickson et al. . | |
| 4,986,358 | 1/1991 | Lueders et al. . | |
| 5,125,457 | 6/1992 | Meaders | 137/527 X |
| 5,159,949 | 11/1992 | Prescott et al. . | |
| 5,201,371 | 4/1993 | Allen . | |
| 5,203,410 | 4/1993 | Cobb et al. . | |
| 5,213,125 | 5/1993 | Leu . | |
| 5,263,847 | 11/1993 | Akkerman | 251/303 |
| 5,411,096 | 5/1995 | Akkerman . | |
| 5,465,786 | 11/1995 | Akkerman . | |
| 5,682,921 | 11/1997 | Rawson et al. | 137/527.6 |

*Primary Examiner*—Denise L. Ferensic
*Assistant Examiner*—Ramyar Farid
*Attorney, Agent, or Firm*—Rosenblatt & Redano, P.C.

[57] ABSTRACT

The invention relates to a pair of matched surfaces usable in sealing a downhole subsurface safety valve. The continuous seat and the matching flapper profile feature a surface that is around its periphery transverse to the longitudinal axis of the seat and the flapper. The seating surface, if extended in a two-dimensional plane, defines an undulating shape which can be a sinusoidal shape in the preferred embodiment. The result is an improvement in the performance of the metal-to-metal contact between the seat and the flapper, coupled with a self-centering effect when the seating surface on the flapper, which is formed adjacent a shoulder, is presented in opposition to the seat. Additionally, the transverse undulating seat can have an embedded groove which accommodates a resilient seal, preferably PTFE or Teflon®.

5 Claims, 4 Drawing Sheets

$h + Y = R1 : Y = R1 - h$ $h^2 + X1^2 = R1^2 : h = (R1^2 - X^2)^{.5}$ $Y = R1 - (R1^2 - X1^2)^{.5}$ $\sin(T) = X1/R$ $X1 = R * \sin(T)$ $Y = R1 - \{R1^2 - [R * SIN(T)]^2\}^{.5}$ circumference (C) = $R * T(2\Pi$ radians)

cord length (X) = $R * T$(radians)

: for unwrapped X position on circumference $X = R * T$

UNDULATING TRANSVERSE INTERFACE FOR CURVED FLAPPER SEAL This is a continuation of copending application Ser. No. 08/654,377, filed on May 28, 1996, now U.S. Pat. No. 5,682,921.

FIELD OF THE INVENTION

The field of this invention relates to design of seating surfaces of curved flapper valves, particularly those used in subsurface safety valves.

BACKGROUND OF THE INVENTION

In the past, subsurface safety valves have had a variety of layouts of matched surfaces used for sealing. Curved flappers, when used in safety valves, allowed for a reduced wall or "slimline" safety valves. This feature has increased the popularity of curved flappers in subsurface safety valves. These have been either metal to metal or have involved some sort of resilient seal. The techniques previously used to cut such sealing surfaces have involved maintaining the flapper or flapper seat piece in a stationary position while the cutter was rotated about a radius from a fixed point. What resulted was that the seat and the flapper seating surface presented an undulating profile when extended into a flat plane. During the low segments of this undulating profile, the two surfaces were, in essence, in a plane transverse to the longitudinal axis of the seat or the flapper. However, taking off from those points, the seating surface and the mating flapper surface moved into a transverse plane or planes with respect to the longitudinal axis of the seat or the flapper. This type of profile is illustrated in FIGS. 1–3 which indicate the prior design. FIG. 1 illustrates a plan view of a seat or the matching surface on the flapper, while sections 2 and 3 are taken at different points along its continuous surface. The view of FIG. 1 illustrates the plan view looking down, with the X-axis transverse to the Z-axis as indicated. The Sections 2 and 3 are on the plane of the XZ-axis. FIG. 2 shows that at the low points of the surface, the sealing surface is essentially transverse to the Y-axis. However, this situation in the prior designs changes as one moves away from the point of Sections 2—2 toward Section 3—3, which is illustrated in FIG. 3. There the sealing surface is illustrated to be oblique with respect to the Y-axis. This occurs because the nature of how the cut is made either in the flapper or in the seat. In essence, the centerline of the cutter is only fully transverse to the seat at several points along the continuous surface while it is being cut and at other times is oblique to the surface being cut.

The drawbacks of the prior design are that it is not self-centering and it does not present as efficient a metal-to-metal contact as the present invention. Accordingly, the present invention has been developed to improve the quality of the metal-to-metal contact to provide a better sealing engagement to reduce or eliminate leakage. The objective is to reduce leakage rates even without the application of resilient seals. The addition of a resilient seal in the seat is easier to make with the new design. The techniques, as illustrated in the present invention, also have as an objective accommodating a design as a metal-to-metal mating, with or without the use of resilient seals.

The invention accomplishes these improvements by disposing the sealing surfaces throughout the entire 360° periphery to be in a plane transverse to the longitudinal axis of the seat and flapper. This design facilitates the addition of a seal groove in the seat to accommodate a resilient seal. It also permits use of a stronger hinge since the machined surface of the seating face on the flapper is parallel to the inner hinge surface.

SUMMARY OF THE INVENTION

The invention relates to a pair of matched surfaces usable in sealing a down-hole subsurface safety valve. The continuous seat and the matching flapper profile feature a surface that is around its periphery transverse to the longitudinal axis of the seat and the flapper. The seating surface, if extended in a two-dimensional plane, defines an undulating shape which can be a sinusoidal shape in the preferred embodiment. The result is an improvement in the performance of the metal-to-metal contact between the seat and the flapper, coupled with a self-centering effect when the seating surface on the flapper, which is formed adjacent a shoulder, is presented in opposition to the seat. Additionally, the transverse undulating seat can have an embedded groove which accommodates a resilient seal, preferably PTFE or Teflon®.

DETAILED DESCRIPTION OF THE PREFERRED EMBODIMENT

Figure 1:
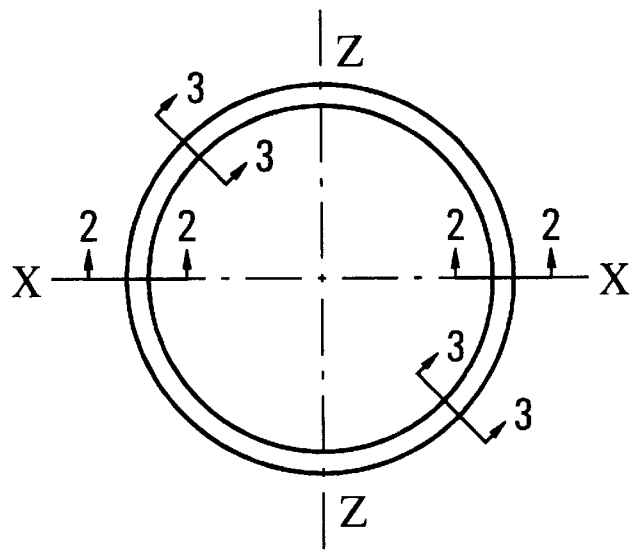
FIGS. 1–3 illustrate in plan and two sections, respectively, a typical presentation of a seating surface of the prior design.
Figure 2:
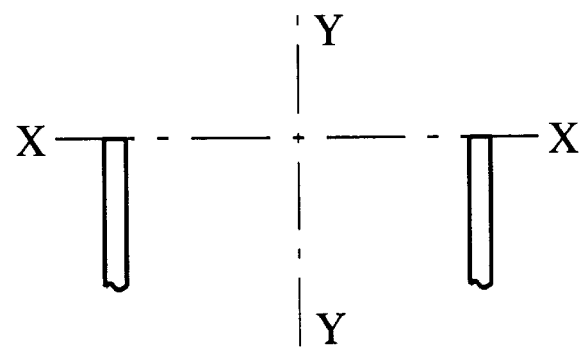
Figure 3:
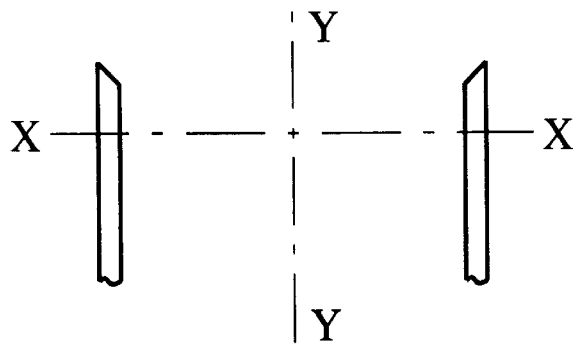
Figure 4:
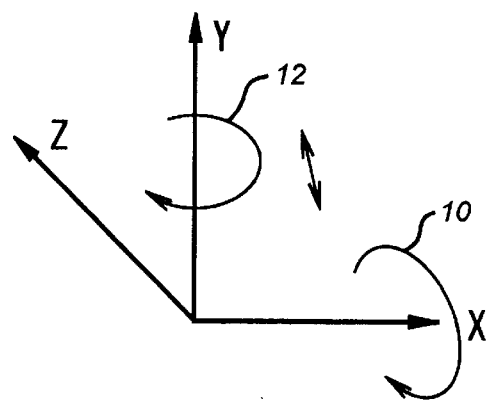
FIG. 4 is a series of axes used to illustrate the positioning of the cutter and the piece to be cut to illustrate how the seat and flapper surfaces are produced.
Figure 5:
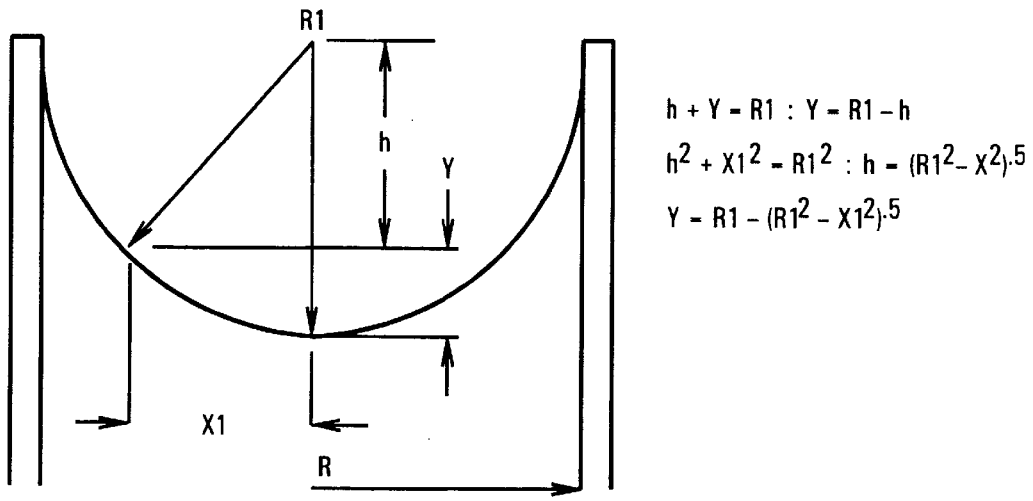
FIG. 5 is a section in the ZX-axis of FIG. 4 taken through the sinusoidal seating surface.
Figure 6:
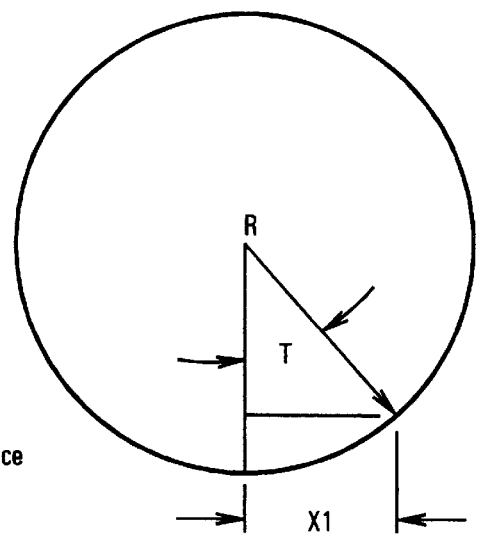
FIG. 6 is an end view of the sinusoidal surface showing some of the relevant geometrical relationships.

The design of the prior art seats and flappers has been described in the background of the invention and illustrated in FIGS. 1–3. The seat flat sealing surface of the present invention can be better understood by reviewing FIG. 4. In FIG. 4, the X-axis represents the centerline of the cutting tool and arrow 10 the direction of the rotation of the cutting tool. The milling machine holds the piece along the Y-axis and is capable of advancing along the Y-axis, while at the same time rotating it in the direction shown by arrow 12. It will be noted that the longitudinal axis of the cutting tool and of the piece being cut are preferably at 90°. The piece to be cut on the Y-axis, whether it is the seat or the flapper, is engaged in a machine and rotated and fed along the Y-axis with respect to the cutter which rotates along the X-axis as indicated by arrow 10. FIGS. 5 and 6 illustrate the mathematical derivation that is used in order to reproduce the sealing surface of the present invention.

In FIGS. 5 and 6, R is the inside radius of the sealing surface. $R^1$ is the intersecting radius.

FIGS. 5 and 6 illustrate the relationships that are used to program the computer-controlled milling which needs to take place to produce the sealing surface, which is generally flat, to the longitudinal axis of the seat and the flapper. The significant variables which dictate the positioning of the piece with respect to the cutter are: $X^1$ dictates the rotational movement required about the Y-axis of the piece with respect to the rotating cutter, while the variable Y illustrates the movement along the Y-axis of the piece with respect to the rotating cutter. Using algebra and known geometric relationships, the variables X and Y can be calculated in terms of known quantities and the machine can be programmed accordingly. The derivation is given in FIG. 5, with T expressed in radians.

Figure 7A:
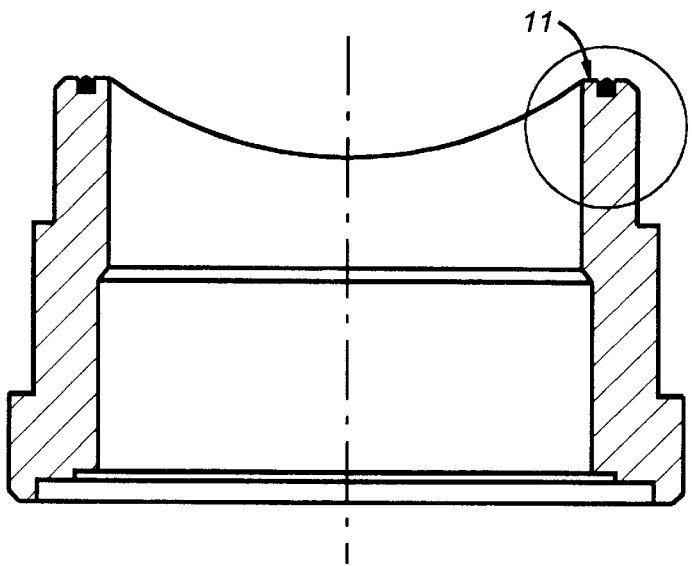
FIGS. 7a–d are section views of the seat with its axis in alignment with the Y-axis of FIG. 4 and shown in two transverse planes with a detail showing the groove for the resilient seal.
Figure 7B:
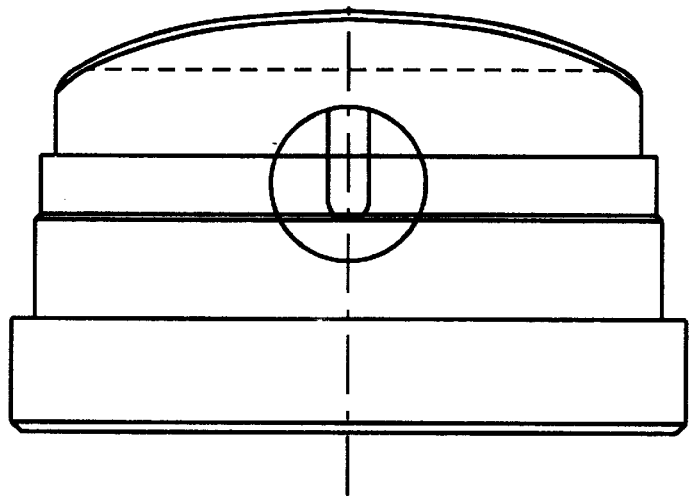
Figure 7C:
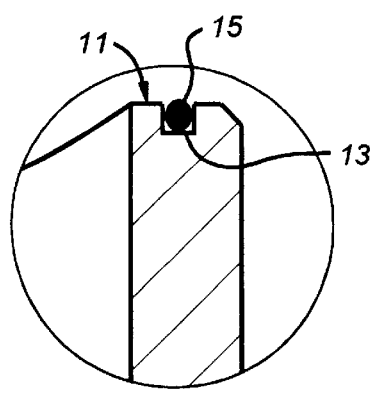
Figure 7D:
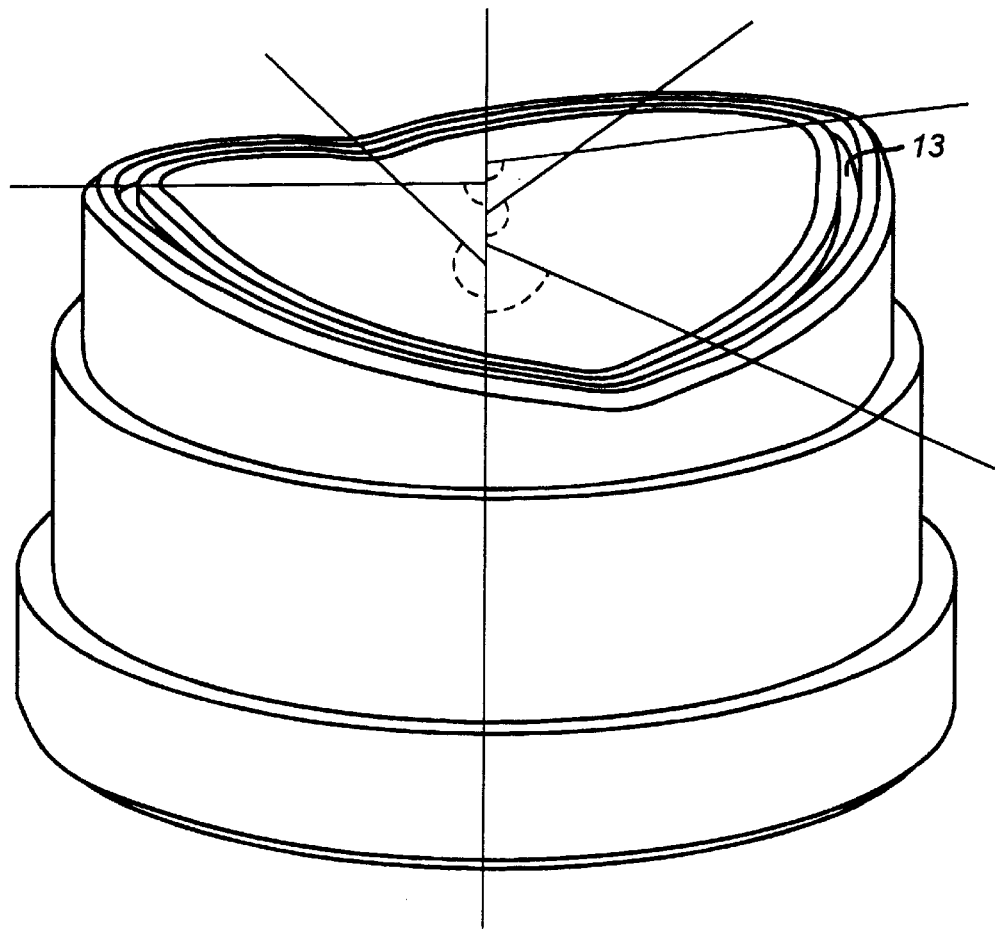

While the profile of the seat when extended into a two-dimensional plane can be a true sinusoid, modification of a true sinusoid is also within the scope of the invention. In fact, a succession of undulating curves, each forming a segment of a circle having a finite radius, can also be used to create the undulating shape of the seat and the matching flapper. Referring to FIG. 7c, it can be seen that the seat 11 can be made having a groove 13, which extends around the entire periphery of the seat. Inserted in groove 13 is a resilient seal 15, preferably of PTFE, commonly known as Teflon®. "Resilient" comprises flexible materials, including but not limited to metals, plastics, or other natural or manmade materials. However, other materials can be used without departing from the spirit of the invention. In view of the fact that the seat 11 is in an undulating plane transverse to the longitudinal axis around the entire periphery, machining of the groove 13, so that it has consistent dimensions all around, is a fairly simple process. The groove can be embedded in the seat or off to one side or the other.

The prior designs, which cut the seat from a fixed point so that only portions of the seat are transverse to the longitudinal axis, made it exceedingly difficult to cut a seal groove, such as 13, of uniform dimensions throughout the 360° extent of the seat. However, with the undulating design, the groove 13 can be cut within the seat face 11 and can be of uniform dimensions throughout. The combination of the undulating shape, in a transverse series of planes with respect to the longitudinal axis, with the seal 15 in groove 13, provides additional sealing integrity to the combination of flapper with seat, as illustrated in FIGS. 7a–b and 8.

Figure 8:
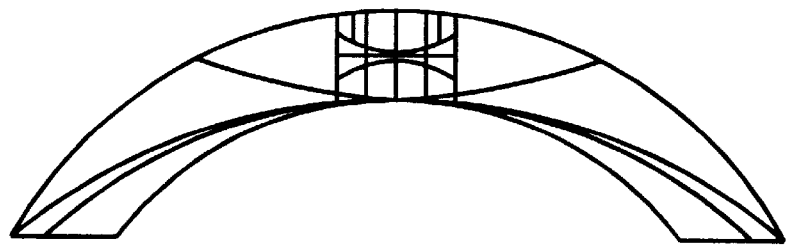
FIG. 8 is a section view of the flapper with its central axis aligned with the Y-axis of FIG. 4.

The net result of this machining can been seen in FIGS. 7 and 8 which illustrate the seat and the flapper. In FIG. 7, the cross-section is taken transverse to the Y-axis of FIG. 4. Again, as previously stated, when fabricating the seat, it is held by the machine with its longitudinal axis in alignment with the Y-axis. The seat, for example, is fed longitudinally and rotationally about the Y-axis pursuant to the formula indicated in FIG. 5. The same technique is used to make the flapper, which is illustrated in FIG. 8, in section with the axis therethrough being the Y-axis of FIG. 4.

As a result of using these techniques, a seat and flapper are produced that have a sinusoidal or other undulating profile, throughout the 360° extent of the surface, where the sealing surfaces are presented in a transverse plane to the longitudinal axis of the seat and the flapper when placed in a mating closed position. The flapper and seat have sealing surfaces that have deviation from each of less than 0.001 inch.

The foregoing disclosure and description of the invention are illustrative and explanatory thereof, and various changes in the size, shape and materials, as well as in the details of the illustrated construction, may be made without departing from the spirit of the invention.

We claim:

1. A method of forming a seat and conforming flapper for a downhole safety valve, wherein the seat comprises a central axis and 360° peripheral undulating sealing surface surrounding said central axis defined by an infinite number of radially extending lines from said central axis across said sealing surface, wherein each said line forms a line tangent across said sealing surface at a constant angle with respect to the central axis for the entire periphery of said sealing surface for 360° contact thereon by said flapper when the downhole safety valve is closed, said method of forming said sealing surface on said seat comprising:

aligning a cutter on an axis which is not parallel to said central axis;

rotating said cutter; and rotating said seat while moving said seat along the central axis in contact with said cutter.

2. The method of claim 1, further comprising:

aligning the axis of said cutter so that said axis intersects said central axis.

3. The method of claim 1, further comprising:

using said method of forming said sealing surface to make said flapper to conform said flapper to said sealing surface.

4. The method of claim 3, further comprising:

forming a groove on said sealing surface on said seat; and placing a resilient seal in said groove for contact with the flapper for sealing therewith.

5. The method of claim 1, further comprising:

locating the cutter axis at about 90° to said central axis.

* * * * *